United States Patent [19]

Kaneko et al.

[11] Patent Number: 4,890,274

[45] Date of Patent: Dec. 26, 1989

[54] OPTICAL INFORMATION RECORDING AND REPRODUCING APPARATUS

[75] Inventors: Nobuyuki Kaneko, Kokubunji; Kiichi Kato, Hachioji, both of Japan

[73] Assignee: Olympus Optical Co., Ltd., Tokyo, Japan

[21] Appl. No.: 196,827

[22] Filed: May 20, 1988

Related U.S. Application Data

[63] Continuation of Ser. No. 852,273, Apr. 15, 1986, abandoned.

[30] Foreign Application Priority Data

Apr. 16, 1985 [JP] Japan .................. 60-81152

[51] Int. Cl.$^4$ .................. G11B 7/00; H05J 40/14
[52] U.S. Cl. .................. 369/45; 369/124; 250/201
[58] Field of Search .................. 369/45, 44, 106, 124; 346/762; 250/201 DF

[56] References Cited

U.S. PATENT DOCUMENTS

| | | | |
|---|---|---|---|
| 4,357,696 | 11/1982 | Bierhoff | 369/45 |
| 4,417,330 | 11/1983 | Hazel et al. | 369/45 |
| 4,446,546 | 5/1984 | Miller | 369/45 |
| 4,475,182 | 10/1984 | Hasaka | 369/45 |
| 4,503,324 | 3/1985 | Yokota | 369/45 |
| 4,607,157 | 8/1986 | Millos | 250/201 |
| 4,611,317 | 9/1986 | Takeuchi | 369/45 |
| 4,613,964 | 9/1986 | Ichikawa | 369/45 |
| 4,658,391 | 4/1987 | Nozu | 250/201 |
| 4,663,750 | 5/1987 | Hamanaka | 250/201 |
| 4,700,056 | 10/1987 | Silvy et al. | 369/45 |
| 4,701,603 | 10/1987 | Dakin et al. | 250/201 DF |

FOREIGN PATENT DOCUMENTS

DE3602640 8/1986 Fed. Rep. of Germany .
57-208642 6/1981 Japan .
58-12142 7/1981 Japan .

Primary Examiner—Steven L. Stephan
Attorney, Agent, or Firm—Armstrong, Nikaido, Marmelstein, Kubovcik & Murray

[57] ABSTRACT

In an optical information recording and reproducing apparatus for recording and reproducing information by controlling the focus of an optical system for condensing and projecting lights of a light source onto a recording medium, an offset part produced in case the lights are condensed and projected in a focus servo state in data writing regions in the recording medium and prepit regions which are adjacent to the data writing regions and in which discriminating codes are written is detected in the respective format regions by a format detecting means and an offset fluctuation controlling voltage is impressed on the basis of this detecting signal to inhibit the fluctuation of the offset in the respective regions of different formats.

6 Claims, 4 Drawing Sheets

FIG. 1   PRIOR ART
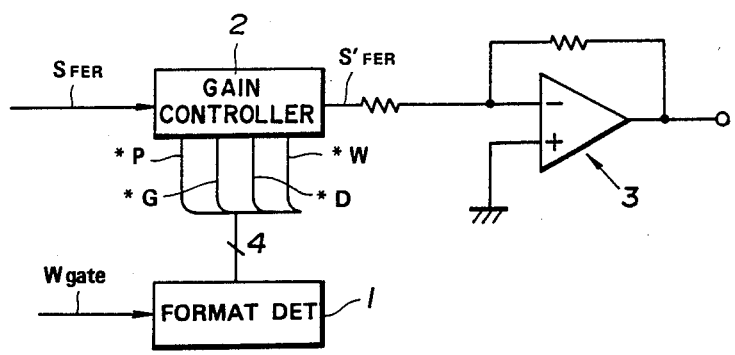
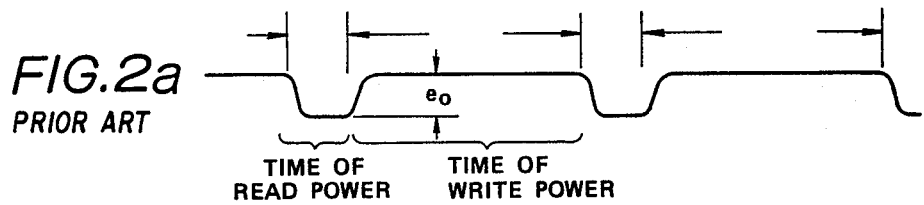
FIG. 2a
PRIOR ART
TIME OF READ POWER   TIME OF WRITE POWER
$e_o$
FIG. 2b
FIG. 4
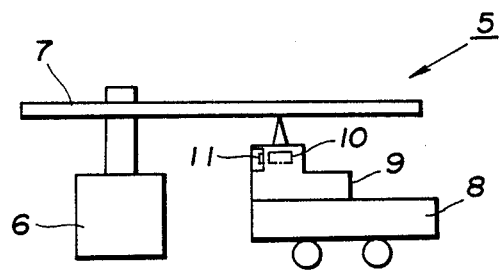

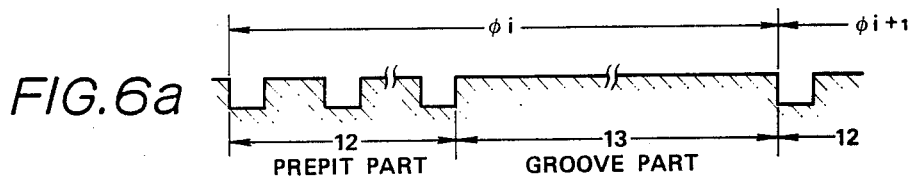
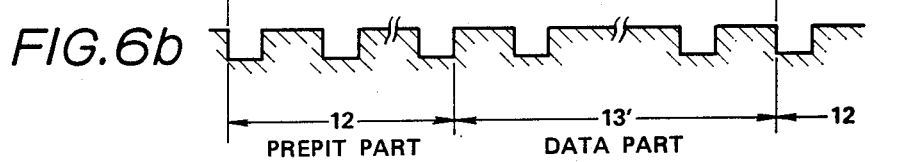
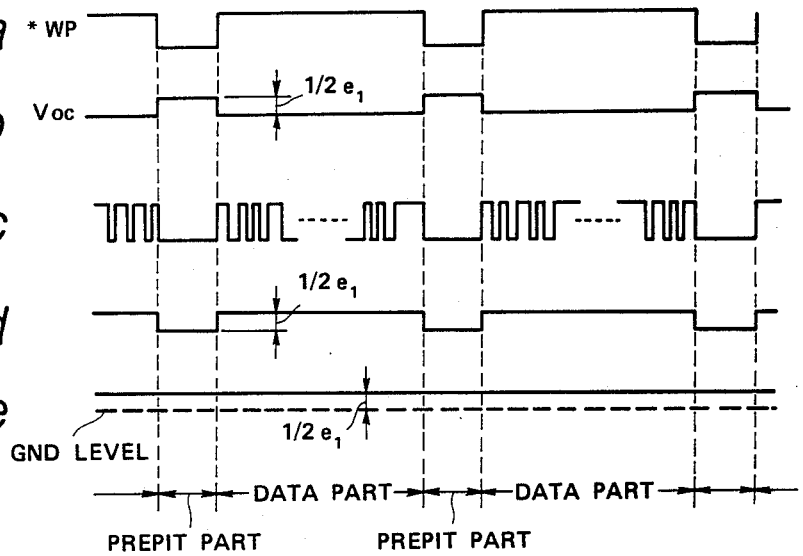

FIG.9
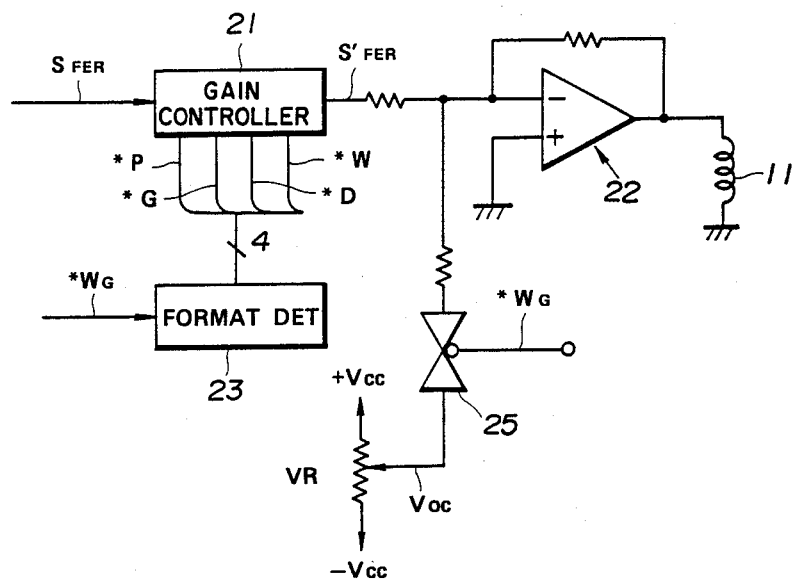
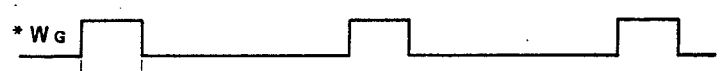
FIG.10a  *WG
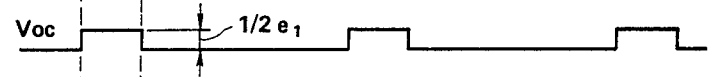
FIG.10b  Voc
FIG.10c
FIG.10d
FIG.10e
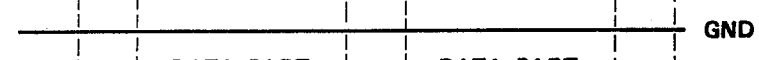
FIG.10f

OPTICAL INFORMATION RECORDING AND REPRODUCING APPARATUS

This application is a continuation of application Ser. No. 852,273 filed Apr. 15, 1986 now abandoned.

FIELD OF THE INVENTION AND RELATED ART STATEMENT

An optical recording or reproducing apparatus wherein, by using light beams, information can be recorded at a high density or can be reproduced at a high velocity has recently come to be considered instead of a recording or reproducing apparatus wherein, by using a magnetic head, information is recorded or reproduced.

In the case of recording information in an optical information recording medium (which shall be called an optical disc hereinafter) to be rotated and driven, so that the information may be recorded without fail, for example, in a preformat system, one round of respective concentric tracks is divided into scores of sectors and the track address information and sector numbers are recorded in advance in the preformat parts (prepit parts) so that information data to be recorded may be written into group parts (which shall be called data parts because data are written into them) adjacent to the respective preformats. In making this recording, the address numbers and the other above-noted elements are written in the preformat parts as described above and the preformat parts are irradiated with weak light beams. On the other hand, in writing data into the data parts, the data parts are irradiated by varying the output power of the light source to write in bivalented data.

That is to say, in the preformat parts, the track addresses and sector numbers are read out with a weak light as a reading power. In the data writing parts, the data are written in with a strong light as a writing power. Therefore, when data are to be written in one round of the tracks, the output light will repeat to be strong and weak by the number of the divided sectors. There has been a defect that, at this time, between the preformat part and the part into which data are written, an offset will be produced in the focus servo-control system and the written data will be different in the modulation degree.

A concrete explanation shall be made in the following with reference to FIGS. 1 and 2. FIG. 1 shows a block diagram for making a conventional focus servo-control. Here, a method of making a focus control with the movement of an objective lens shall be explained. A focus error signal $S_{FER}$ corresponding to the relative distance between a disc and an objective lens within a pickup is obtained by detecting a reflected light from the disc. For detecting this focus error signal $S_{FER}$, the critical angle method and several other means are known and may be used.

The format detecting part 1 is to detect the kind of the disc format of the part now irradiated by light beams. In response to this detecting signal, the gain controlling part 2 switches the gain of the focus error signal $S_{FER}$ to control the magnitude of the output signal to the reversing amplifier 3 side. That is to say, when information is reproduced from the disc, at the time of the so-called reading mode, in response to what parts of the preformat parts, group parts and data parts the light beams are scanning, control signals *P, *G and *D will be output from the respective lines and will be set at optimum gain. That is to say, in response to the above mentioned respective parts, the reflection factor of the light beams is different and is therefore held on a proper level.

By the way, in the gain controlling part 2, at the time of a writing mode, a gate signal $W_{gate}$ indicating the writing mode will be input and light beams will be projected onto the data parts with a light of a power higher than of the reading mode. At the time of this writing mode, in the data parts, the focus servo gain will be reduced to be lower than the gain at the time of the reading mode by the control signal *W. By the way, at the time of the writing mode, in the preformat parts, the light will be emitted by the light emitting power at the time of the reading mode and therefore the gain will be set at the preformat gain at the time of the reading mode.

The focus error signal $S'_{FER}$ having had the gain adjusted is reversed by the reversing amplifier 3 and is then added to a focus actuator (not illustrated) through a phase compensating circuit (not illustrated) or the like. The focus actuator is a means for moving the objective lens in the vertical direction with respect to the disc surface. By the above formation, there is formed a closed servo-loop adjusting the position of the objective lens so that the light beams may be focused on the disc.

Now, FIG. 2a is to explain the fluctuation of the offset part. That is to say, at the time of the writing mode, when the light beams move from the preformat parts (emitting the reading power light) to the data parts (emitting the writing power light), holes called pits will be formed in the medium in the data parts and therefore an offset part of the focus error corresponding to $e_o$ will be generated. Here, when the focus servo-control is on, the output of the reversing amplifier 3 will vary as in FIG. 2b.

Here, the input end on the non-reversing side of the reversing amplifier 3 is set on the ground level, the output end of this reversing amplifier 3 puts out a transitional signal on the boundary of the preformat part and data part as shown in FIG. 2b and then varies to converge on the ground level with the time, because a signal varying to be offset as shown in FIG. 2a enters the reversing input side of the reversing amplifier 3 and therefore the objective lens of the pickup is moved toward the disc by the amount corresponding to the offset variation amount $e_o$. Therefore, when the transitional response converges on the ground level as shown in FIG. 2, the distance (from the disc) of the objective lens will be offset by the distance corresponding to $e_o$. Therefore, when data are written into the data parts, the objective lens position will vary at the beginning end and ending end of the data part, therefore the modulation degree of the recorded data will be different depending on the location and the data will be misread.

Therefore, there are produced problems that such reliability of writing in and reading out information as is a very important factor as of a recording and reproducing apparatus will reduce and will not be able elevated.

Now, in the prior art example disclosed in the Japanese patent laid open No. 208642/1982, respective signals photoelectrically converted by a plurality of light receiving elements for detecting focus errors are respectively envelope-detected to form focus controlling signals. By this envelope waveform signal, the influence of the diffraction or interference pattern by the pit row can be excluded. However, in this prior art example, the influence of the fluctuation of the offset at the time of the above mentioned writing mode can not be well reduced.

On the other hand, in the prior art example disclosed in the Japanese patent laid open No. 12142/1982, the signal at the time of the reading power in the part forming no pit between the adjacent pits in the case of forming a pit row in the writing mode is sample-held and the focus is controlled with this sample holding value.

This prior art example shows no method of solving the above mentioned problems.

However, in this prior art, there has been a defect that a high speed control system is required.

OBJECTS AND SUMMARY OF THE INVENTION

An object of the present invention is to provide an optical information recording and reproducing apparatus wherein misreading can be reduced.

Another object of the present invention is to provide an optical information recording and reproducing apparatus wherein information can be recorded and reproduced at a high reliability with a simple formation.

According to the present invention, in a focus servo system adjusting the focus of an optical system condensing and projecting lights onto a recording medium on the basis of a focus error signal, reflected lights or the like from the recording medium are received to detect a recording format and, on the basis of this detected signal, an offset level adjusting signal is added to the focus error signal so that the offset amount of the writing mode may be of a small fixed value or zero.

BRIEF DESCRIPTION OF THE DRAWINGS

FIG. 1 is a formation diagram of a part forming a focus controlling signal in a conventional example.

FIGS. 2a and 2b are operations explaining diagrams of FIG. 1;

FIGS. 3 to 8b relate to the first embodiment of the present invention.

FIG. 3 is a formation view of a part forming a focus controlling signal in the first embodiment.

FIG. 4 is a schematic side view showing the appearance of the first embodiment.

FIG. 5 is an explanatory view for showing the structure of the recording regions of a disc.

FIGS. 6a and 6b are sectioned views of a track as sectioned along the track of the disc.

FIGS. 7a-7e are explanatory views for explaining the operation in a writing mode in the first embodiment.

FIGS. 8a and 8b are explanatory views for the operation in a reading mode in the first embodiment.

FIG. 9 is a formation view showing the formation of a main part in the second embodiment of the present invention.

FIGS. 10a-10f are explanatory views for explaining the operation of the second embodiment.

DETAILED DESCRIPTION OF THE PREFERRED EMBODIMENTS

Figure 3:
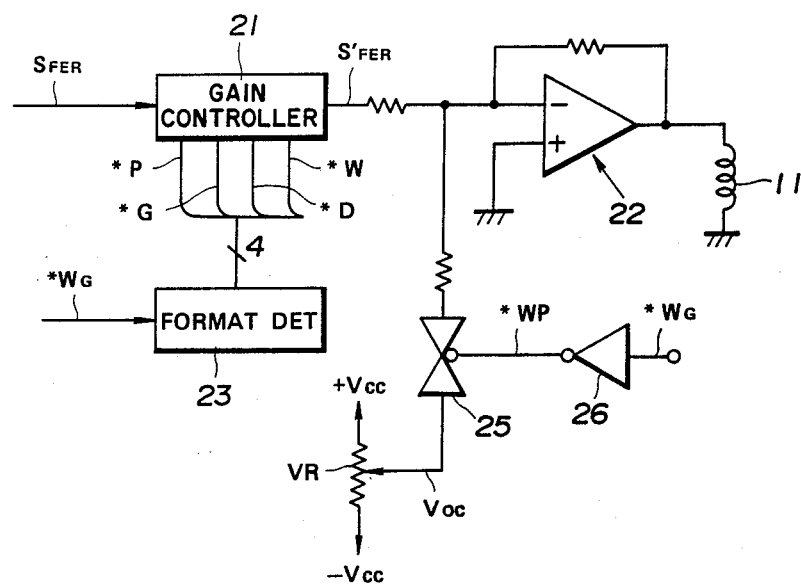

As shown in FIG. 4, in an optical information recording and reproducing apparatus 5 of the first embodiment, a disc 7 as a disc-shaped recording medium fixed to a rotary shaft of a spindle motor 6 is rotated and driven by the spindle motor 6 and an optical pickup 9 is moved in the radial direction of the disc 7 by a coarse moving means, for example, by a voice coil motor 8 as opposed to one surface of this disc 7 so as to be able to be set near a target track in concentric circular tracks.

Such condensable light source as of a semiconductor laser is contained in the above mentioned optical pickup 9 so that the lights of this light source may be condensed on the disc 7 by an objective lens 10 so as to be projected. The objective lens 10 in this optical pickup 9 can be moved in the direction vertical to the disc surface by an electric current flowing through the coil of a focus actuator 11 so that the light beams projected onto the disc surface may be set as focused (that is, as a sopt light).

The above mentioned objective lens 10 can be moved in the radial direction of the disc 7 by the current flowing through the coil of the tracking actuator.

Figure 5:
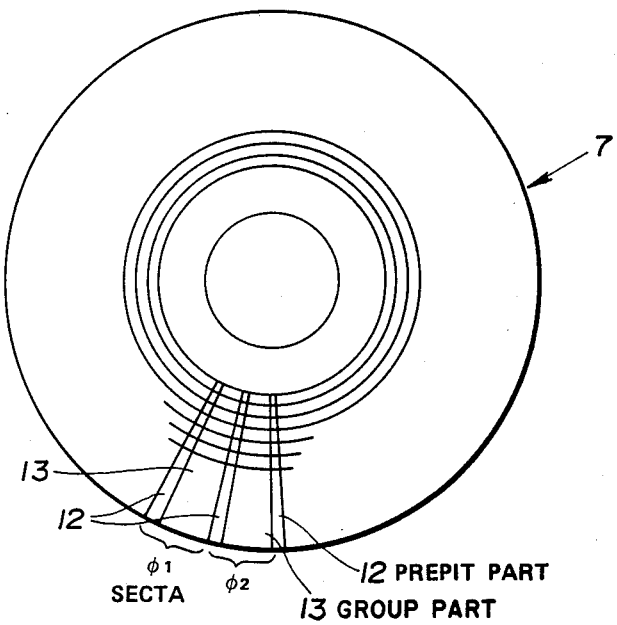

Now, as shown in FIG. 5, on the above mentioned disc 7, concentric circular tracks are formed in the part from somewhat outside a center hole to the vicinity of the outermost periphery, one round of the respective tracks is divided into, for example, scores of fan-shaped sectors $\phi_1$, $\phi_2$, $\phi_3$,—and preformat parts (prepit parts) 12 bearing track addresses, sector numbers and others are formed in the tip parts of the respective sectors $\phi_i$ (i=1, 2,—). Group parts 13 into which data are to be written are formed adjacently to the respective prepit parts 12. These group parts 13 are groove-shaped so that light beams may follow these parts in the case data are to be written into the group parts 13. The sectioned views when the tracks on the disc 7 are linearly extended and are seen from the radial direction will be as shown in FIG. 6. Here, the group part 13 is flat as shown in FIG. 6a before data are written in but, when data are written in, the recording layer will be melted to form holes, concavoconvexes corresponding to the data will be formed as shown in FIG. 6b and the group part 13 will be called a data part.

In order that the fluctuation of the offset produced in the case of varying the light emitting output may be controlled and written into the above mentioned group part 13, a focus servo-controlling signal is formed by such formation as is shown in FIG. 3 in the apparatus of the first embodiment.

The light beams reflected by the disc 7 are received by a quadri-divided detector within the pickup 9, are signal-processed, are then put into a gain controlling part 21 as a focus error signal $S_{FER}$, are made a gain-controlled signal (mentioned as $S'_{FER}$) and are put into a reversing amplifier 22 which is a driving circuit. The output of this reversing amplifier 22 is impressed on the coil of the focus actuator 11 (or through a phase compensating circuit not illustrated) to control the focus.

In the case of the writing mode recording information with light beams, it is detected with a format detecting part 23 whether the light beam are of the prepit parts 12 in the tracks of the disc 7, the group parts 13 in which data are not written or the group parts (mentioned as data parts 13' hereinafter) of the parts in which data are to be written of the group parts 13.

When a prepit part controlling signal (indicated by *P), group part controlling signal (indicated by *G) and data part controlling signal (indicated by *D) are output through signal lines corresponding respectively to the above, the gain of a gain controlling part 21 will be set on a proper level.

That is to say, in the writing mode, in case the parts condensing and projecting lights are the prepit parts, the gain will be made equal to the reading of the prepit parts at the time of reading and, also in the group parts, in case no recording is made in the group parts, the same gain as of the above mentioned prepit parts will be set.

On the other hand, in case data are written into the group parts, the power of the light beams will be set to be large and therefore the gain will be reduced.

Now, in the first embodiment, further the following offset fluctuation controlling means is provided.

That is to say, at the reversing input end of the reversing amplifier 22, an offset controlling voltage $V_{oc}$ divided by a variable resistance VR connected at both ends to positive and negative voltage sources (or constant voltage sources) $+V_{cc}$ and $-V_{cc}$ is to be impressed through an analogue switch 25. This analog switch 25 is to be controlled to be on and off by a writing gate signal $*W_G$ which will be on a low level at the time of a writing light emitting output through a reversing circuit 26.

In case the writing gate signal $*W_G$ is on a high level, that is, the reversed signal $W_p$ (in the reversing circuit 26) is on a low level, that is, the light beams are scanning the prepit parts (See FIG. 7a), the analogue switch 25 will be switched on and the above mentioned offset fluctuation controlling voltage $V_{oc}$ will be impressed as shown in FIG. 7b at the reversing input end. The value of this voltage $V_{oc}$ is set to be ½ the difference $e_1$ between the offset part in the prepit part 12 and the offset part at the writing power light emitting time of the data of the data part 13' as shown in FIG. 7e. By the way, the abscissa in FIG. 7 is supposed to be in the case that the respective parts of the tracks are scanned by the light beams as shown below FIG. 7e. By the way, in order to adjust $V_{oc}$ to be of an optimum value, while writing in several track parts in advance, the focus error signal is observed and the variable resistance VR is adjusted so that the error signal fluctuation shown in FIG. 2b may be seen. By the way, if the decrease of the recording capacity by writing in these several tracks is considered, a separately provided solely offset adjusting disc may be used.

The offset fluctuation in the case of scanning the prepit parts 12 and data parts 13 in the writing mode is dissolved by setting the value of the voltage $V_{oc}$ at ½ the difference $e_1$ of the above mentioned offset parts.

That is to say, in the writing mode, in the case of recording data in the data parts 13' with the writing power, in response to the recorded data, the value will be set at the writing power or at the reading power at a high velocity. Therefore, the offset value within the data parts 13' will be as shown in FIG. 7c. The band of the focus servo operating to remove the offset part produced within the data parts is of a value of 0 to several $KH_z$ at most against the frequency of 100 $KH_z$ to several $MH_z$ of the data. Therefore, in effect, the offset part of the data part 13' can be handled as an average value. Therefore, when the average of the offset part of the data part 13' is approximated to ½ $e_1$, the effective displacement from the offset part in the prepit part 12 will be able to be approximated to ½ $e_1$ as shown in FIG. 7d. Therefore, the voltage $V_{oc}$ is impressed to prevent this effective offset difference part of ½ $e_1$ from being produced while the prepit part 12 is being scanned in the case of the writing mode. Therefore, as shown in FIG. 7e, in the writing mode, in the prepit part 12 and data part 13', the effective value of the offset is ½ $e_1$ on the ground level and the fluctuation of the offset can be substantially dissolved.

Therefore, at the time of the writing mode, an equal offset level will be held through the writing power light emitting time and reading power light emitting time of the prepit part 12 and data part 13'. By the way, the above mentioned effective offset average value is set at ½ $e_1$ but the offset voltage $V_{oc}$ to be impressed may be adjusted so that the above mentioned level of FIG. 7e may be fixed.

Now, in the reading mode, the same as is shown in FIG. 1, in case the reflection factor or the like of the respective parts is different, in consideration of the influence of the reflection factor or the like, a proper level will be held with the gain controlling part 21. By this gain control, as shown in FIG. 8a, the offset level in the case of scanning the prepit parts 12 or group parts 13 will be held substantially on the ground level and therefore the output level of the reversing amplifier 22 will be also held in the (just) focus state substantially on the ground level.

According to the above mentioned first embodiment, at the time of the writing mode, even if the light emitting output varies in the respective irradiated parts, as the fluctuation of the offset produced by the variation of the light emitting output is inhibited, the modulation degree in the case of writing data into the data parts 13' will no longer fluctuate. Therefore, the sizes of the pits formed in the data parts 13' in the writing mode become uniform and the misreading in the reading mode can be reduced. Also, the reliability of the recording and reproduction in the recording and reproducing apparatus can be improved.

Further, an apparatus simple in the formation and high in the reliability can be realized. The response frequency required of the means of inhibiting the fluctuation of the offset may be low enough and therefore low cost parts can be used.

FIG. 9 shows a circuit of a main part in the second embodiment of the present invention. In this circuit formation, the writing gate signal $*W_G$ is impressed on the analogue switch 25 to control it to be switched on and off not through the reversing circuit 26 in the above mentioned first embodiment.

In this second embodiment, in case data are being written into the group parts in the writing mode, the offset fluctuation inhibiting voltage $V_{oc}$ will be improved.

That is to say, in case data are to be written into the data parts of an object track by scanning the respective parts shown by the abscissa in FIG. 10, when the light beams scan the data parts, the light gate signal $*W_G$ will be on a low level as shown in FIG. 10a and, when the signal is on the low level, the analogue switch 25 will be on. When this analogue switch 25 is switched on, in the data parts, the offset fluctuation controlling voltage $V_{oc}$ of a value of ½ $e_1$ will be impressed on the reversing amplifier 22 at the reversing input end.

Now, when the light beams scan the above mentioned tracks, as shown in FIG. 10c, an offset difference will be produced between the prepit part and data part and, when the offset parts on the data side are averaged, they will vary as shown in FIG. 10d.

In the above mentioned FIG. 10c or 10d, the offset in the prepit parts is GND and an offset will be produced in the data parts but, as the analogue switch 25 is switched on and the offset fluctuation inhibiting voltage $V_{oc}$ of a value of $-½ e_1$ is impressed to cancel the offset part of ½ $e_1$ in FIG. 10d, in case this offset fluctuation inhibiting voltage $V_{oc}$ is impressed on the offset part in the case shown in FIG. 10c, the offset part will be as shown in FIG. 10e. Also, for FIG. 10d, the offset part will be as shown in FIG. 10f. That is to say, in the average value, the offset fluctuation will be dissolved and the value of the offset level will be held substantially at 0.

The above mentioned first embodiment inhibits the fluctuation of the offset so as to be small and to be of a fixed offset amount, whereas the second embodiment further holds the offset amount to be substantially zero and is therefore more effective than the first emobodiment. Therefore, as the advantages of this second embodiment in addition to the advantages of the above mentioned first embodiment, for example, the size of the pit to be formed can be made small, the record can be made high in the density, the space until an error is generated at the recording and reproducing time can be made large and the reliability of the recording and reproducing apparatus can be improved.

By the way, in the above mentioned explanation, the lights are condensed and projected onto the recording medium and their reflected lights are received but the present invention can be applied also to an apparatus of a system of receiving passing lights.

It is apparent that working modes different in a wide range can be formed without departing from the spirit and scope of the present invention. The present invention is not to be restricted to its specific working mode except being limited in the appended claims.

What is claimed is:

1. An optical information recording and reproducing apparatus, comprising:
    an optical system for condensing lights generated in a light source and projecting said lights onto an optical recording medium,
    a focus actuator means having a focusing coil and impressing a driving signal on said coil to vary the distance of said optical system from said recording medium to adjust the focus of said optical system,
    a focus error detecting means for receiving reflected lights or passing lights in said recording medium to output a focus error signal corresponding to an offset amount from the focus state of said optical system,
    a gain controlling means interposed between said focus error detecting means and a driving circuit for receiving a plurality of controlling input signals for variably setting gains and for outputting a driving signal to said focusing coil, and
    an offset fluctuation controlling means for controlling a level shift of said driving signal produced on the basis of said focus error signal,
    whereby the light emitting output of said light source is varied in response to data to be recorded, the data is written into said recording medium and, at the time of a writing mode, said offset fluctuation controlling means is controlled to hold the offset amount of said driving signal to be fixed.

2. An optical information recording and reproducing apparatus according to claim 1 wherein said offset fluctuation controlling means comprises an offset controlling voltage source and a switching means interposed between said voltage source and the input end of said driving circuit and having a controlling input controlled to be on and off with signals indicating data recording region.

3. An optical information recording and reproducing apparatus according to claim 2 wherein said voltage source is set at ½ the offset difference between both focus error signals in data writing regions in which data in said recording medium are actually written at the writing mode time and prepit regions which are adjacent to said data writing regions and in which discriminating information is written.

4. An optical information recording and reproducing apparatus according to claim 3 wherein said switching means is to be switched on with said signals indicating data recording region.

5. An optical information recording and reproducing apparatus according to claim 3 wherein said switching means is to be switched on at the prepit region detecting time by a format detecting means.

6. An optical information recording and reproducing apparatus according to claim 1 wherein the gain of a gain controlling means is to be controlled on the basis of a format detecting signal detected by said format detecting means at the reading mode time to inhibit the fluctuation of the size of the focus error detecting signal by the difference of the reflection factor between the respective parts of the format.

* * * * *